United States Patent [19]

Hasha

[11] 4,010,633
[45] Mar. 8, 1977

[54] ANNULAR SEAL
[76] Inventor: Malvern M. Hasha, 1527 Castlerock, Houston, Tex. 77090
[22] Filed: Nov. 17, 1975
[21] Appl. No.: 632,790
[52] U.S. Cl. ............................................ 73/46
[51] Int. Cl.² ................................... G01M 3/04
[58] Field of Search .......... 73/40, 40.5 R, 46, 49.1
[56] References Cited
UNITED STATES PATENTS

| | | | |
|---|---|---|---|
| 2,761,311 | 9/1956 | Baker | 73/46 |
| 3,371,521 | 3/1968 | Hauk | 73/46 |
| 3,490,525 | 1/1970 | Nettles | 73/46 X |
| 3,921,437 | 11/1975 | Hauk | 73/46 X |

Primary Examiner—Jerry W. Myracle
Assistant Examiner—Joseph W. Roskos

[57] ABSTRACT

An annular seal for engaging a tubular member. The seal includes an annular elastomer body having inner and outer surfaces and an interlocking reinforcing means associated with the inner surface of the elastomer body. The reinforcing means includes a plurality of segments and at least some of the segments have an arcuate flange secured thereto between the segment and the inner surface of the annular elastomer body, such arcuate flange extending into the annular space formed between the inner surface of the elastomer body and the outer surface of an adjacent segment.

2 Claims, 4 Drawing Figures

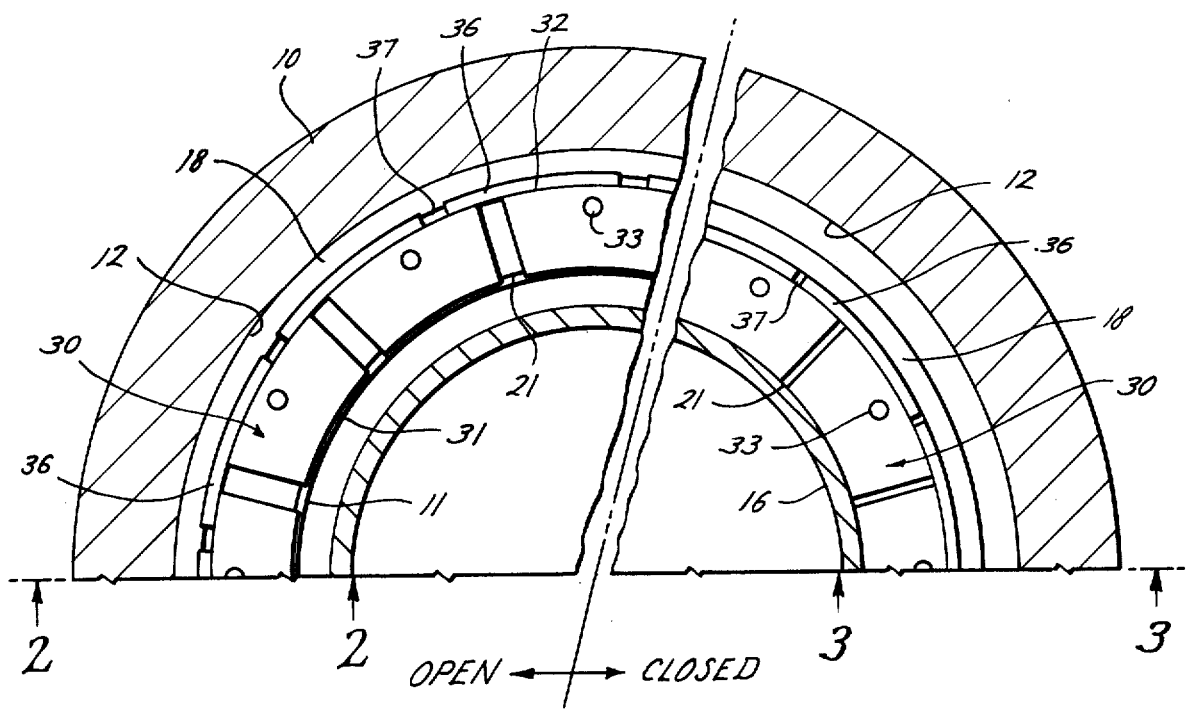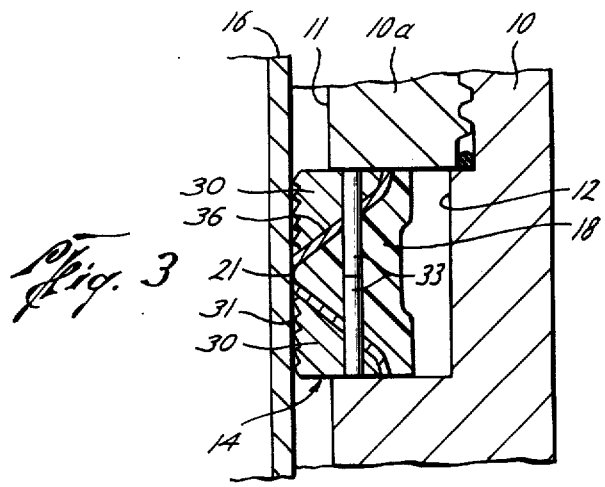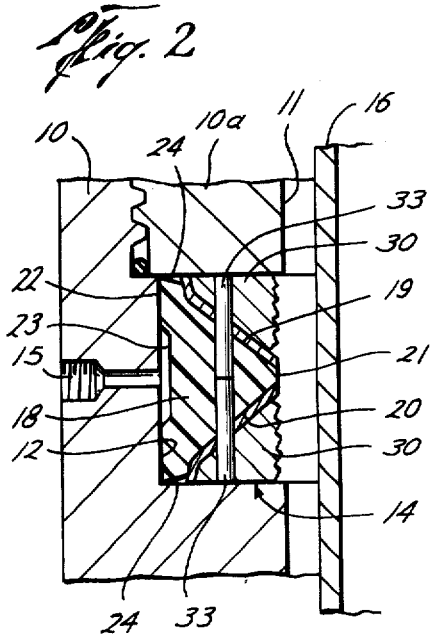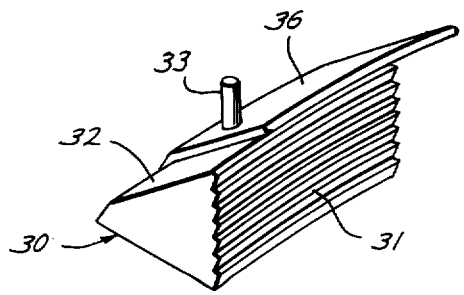

ANNULAR SEAL

CROSS REFERENCE TO RELATED APPLICATION

This is a related application to the prior co-pending application Ser. No. 506,547 filed Sept. 16, 1974 for "Leak Testing Method and Apparatus for Tubular Members and Packer Means Therefor," which application was a continuation-in-part of application Ser. No. 467,133 filed May 6, 1974 for "Leak Testing Method and Apparatus for Tubular Members and Packer Means Therefor."

BACKGROUND AND OBJECT OF THE INVENTION

The related application Ser. No. 506,547 filed Sept. 16, 1974 for "Leak Testing Method and Apparatus for Tubular members and Packer Means Therefor" discloses a method and structural arrangement of an external tester which may be maintained in a position about a tubular member for the testing of a certain portion of the tubular member, such as the connection means thereof, for defects by the use of fluid under pressure. The method and structural arrangement of the external tester disclosed in such application Ser. No. 506,547 includes at least one annular seal capable of radial movement inwardly toward the tubular member for sealingly engaging with the tubular member. The annular seal means disclosed in application Ser. No. 506,547 comprises an annular elastomer body having surfaces extending toward the tubular member and back-up means on such surfaces for aiding in inhibiting extrusion of the elastomer body when the elastomer body is urged into sealing engagement with the tubular member.

In the seal means disclosed in application Ser. No. 506,547, a plurality of back-up means are mounted on the inwardly extending surfaces of the elastomer body at selected spaced arcuate positions. Each of such back-up means is tapered and spaced from the adjacent back-up means whereby when the elastomer body is moved radially inwardly toward the tubular member, the back-up means are moved radially inwardly toward the tubular member and are moved annularly relative to each of the other back-up means.

It has been found that when the annular seal moves radially inwardly a sufficient distance to cause each of the back-up means to contact its two adjacent back-up means, there is formed a continuous barrier which aids significantly in inhibiting extrusion of the elastomer body. However, whenever the diameter of the tubular member and the shape of the annular seal means are such that each of the back-up means does not contact its two adjacent back-up means when the seal means sealingly engages the tubular member, it has been found that extrusion of the elastomer body still occurs. This is because there exist slight spaces between the adjacent back-up means, and the elastomer body, which takes on the characteristics of a liquid when subjected to the enormous pressures involved in the external testing of pipe, will extrude into such spaces. This extrusion causes damage and wear and tear on the annular seal and shortens the life of the seal.

It is an object of this invention to provide an improved annular seal for engaging a tubular member, such seal having an annular elastomer body capable of moving radially inwardly toward the tubular member responsive to a selected fluid pressure being supplied to the outer circumferential surface of the body and having an interlocking reinforcing means associated with the inner annular surface of the elastomer body, which reinforcing means provides a continuous reinforcing barrier inhibiting undesirable extrusion of the elastomer body inwardly toward the tubular member irrespective of the degree of closure of the annular seal.

It is an object of this invention to provide an improved annular seal for use in a testing apparatus for externally testing a portion of a tubular member in which the annular seal sealingly engages with the tubular member responsive to selected fluid pressure supplied to its outer circumferential surface, such annular seal including reinforcing means comprising a plurality of interlocking segments presenting a continuous reinforcing barrier for inhibiting extrusion of the elastomer body inwardly toward the tubular member between adjacent segments irrespective of the degree of closure of the annular seal.

The invention itself, as well as additional objects and advantages thereof, will become readily apparent from the following description when read in connection with the accompanying drawings, in which like numerals represent like parts:

DESCRIPTION OF THE DRAWINGS

FIG. 1 is a partial plan view of the improved annular seal according to this invention positioned within a testing apparatus showing the relative position of the elastomer body and the reinforcing means during non-sealing and sealing engagement with the tubular member.

FIG. 2 is a partial sectional view of the annular seal according to this invention taken at line 2—2 in FIG. 1 and showing the relative position of the seal and the reinforcing means when the seal is not in engagement with the tubular member.

FIG. 3 is a partial sectional view showing the annular seal according to this invention taken of line 3—3 in FIG. 1 and showing the seal and the reinforcing means during sealing engagement with the tubular member.

FIG. 4 is an isometric view of a portion of the preferred reinforcing means according to this invention.

DESCRIPTION OF THE PREFERRED EMBODIMENT

A preferred use for the improved annular seal according to this invention is in connection with the leak testing method and apparatus for tubular members such as is described in United States application Ser. No. 506,547 filed Sept. 16, 1974, which application is expressly incorporated herein by reference. Such an external testing apparatus utilizes at least one annular seal to sealingly engage the tubular member whereby testing operations may be performed. The testing apparatus includes a body having an opening extending longitudinally therethrough. One or more annular seal means are spaced longitudinally within the body opening and are mounted in the body so that when fluid under a selected pressure is supplied through passage means in the body, the annular seal is urged into sealing engagement with the body of the tester and is moved radially of the body into sealing engagement with the tubular member.

Referring to FIGS. 1 and 2 of the instant application, a preferred form of the improved annular seal according to this invention is shown. The body 10 of the external tester has an opening 11 extending longitudinally therethrough. An annular opening or groove 12 is provided in the body 10 and the annular seal, referred to generally at 14, is secured in such annular groove 12 by means of a threaded connection 10a or by means of some other method well known to those skilled in the art. A port 15 extends through the body 10 so that fluid under pressure may be supplied into the annular groove 12 in which is secured the annular seal 14. It is desirable that the annular seal 14 when actuated by fluid pressure sealingly engage with the tubular member 16 shown positioned in the hole 11 of the body 10, and sealingly engage with the top and bottom of the annular groove 12 in the body 10, whereby fluid supplied to either the top or the bottom of the annular seal (as viewed in FIG. 2) will be contained.

The annular seal preferably comprises an annular elastomer body 18 having an inner surface for extending generally toward the tubular member 16 to be sealingly engaged and having an outer circumferential surface for receiving the fluid pressure, the annular elastomer body being capable of moving radially inwardly toward the tubular member 16 responsive to a selected fluid pressure being supplied to its outer circumferential surface and of moving radially outwardly from the tubular member 16 to substantially its original position when the selected fluid pressure is no longer supplied to the outer circumferential surface. More particularly as shown in FIGS. 1, 2 and 3, the inner annular surface of the annular elastomer body preferably comprises sloping surfaces 19 and 20 which taper inwardly to a flat interfacing surface 21 which physically contacts the tubular member 16 to sealingly engage with such tubular member. The outer circumferential surface of the annular elastomer body is shown generally at 22 and preferably includes an annular indentation on a ring 23. When fluid under pressure is supplied through the bore 15 into the annular groove 12, it initially supplies forces against the annular indentation 22 of the annular elastomer body 18. As the elastomer body 18 commences moving radially inwardly toward the tubular member, the entire outer circumferential surface 22 of the annular elastomer body is subjected to the pressure of the fluid.

Each of the sloping surfaces 19 and 20 of the annular elastomer body 18 preferably includes an annular portion 24 [tapered surfaces 23 on the top and bottom thereof as viewed in FIG. 2] of preselected shape which functions to seal against the top and bottom of the annular groove 12. When fluid under pressure is supplied to the outer circumferential surface 22 of the annular elastomer body 18 and such annular elastomer body moves radially inwardly toward tubular member 16, the annular portions [tapered surfaces] 24 are extruded outwardly and sealingly engage the top and bottom of the annular groove 12 in the body 10.

When the selected fluid pressure is no longer supplied to the outer circumferential surface 22 of the annular elastomer body 18, the annular elastomer body 18 moves radially outwardly from the tubular member 16 to substantially its original position within the annular groove 12 in the body 10. The annular elastomer body preferably is constructed of polyurethane.

It has been found that if the annular seal 14 comprises only the annular elastomer body 18, the annular seal rapidly deteriorates through use. This is because the annular elastomer body assumes the characteristics of a liquid when subjected to very high fluid pressures. When the annular elastomer body assumes the characteristics of a liquid, it extrudes outwardly from the annular groove 12 into the opening 11 of the body. In the application Ser. No. 506,547, it was disclosed that preferably back-up means or reinforcing means are associates with the inner surfaces of the annular elastomer body 18 to inhibit the extrusion of the elastomer body. In the application Ser. No. 506,547, annular or arcuate segments were mounted on the sloping surfaces 19 and 20 of the inner surface of the annular elastomer body at selected spaces arcuate positions around the annular elastomer body. Each of these annular segments preferably was triangularly shaped in vertical cross-section whereby the segment could be secured to the tapered surface of the annular elastomer body and present a vertical gripping surface to the tubular member to be sealingly engaged. Each of these segments preferably was tapered in horizontal cross-section and was spaced from its adjacent segment whereby the segments could be moved radially inwardly toward the tubular member as the annular elastomer body was being moved radially inwardly toward the tubular member. In the apparatus disclosed in application Ser. No. 506,547, it is preferable that when the annular seal 14 engages the tubular member 16, the annular elastomer body and the plurality of arcuate segments mounted thereon will have moved radially inwardly sufficiently such that each of the arcuate segments is in physical contact with its two adjacent arcuate segments whereby the arcuate segments cumulatively provide a continuous reinforcing barrier for inhibiting extrusion of the elastomer body between the contiguous segments inwardly toward the tubular member. However, it has been found in practice that often the tubular member 16 has varying diameters or it is necessary to sealingly engage with a coupling or the like having an increased diameter, whereby a decreased amount of radial inward movement of the seal is required before the annular seal engages the tubular member. In such situations, when the annular elastomer body sealingly engages with the tubular member, the various segments mounted along each of the sloping surfaces of the annular elastomer body have not moved radially inwardly sufficiently to contact each other and they do not form a continuous reinforcing barrier.

The improved annular seal according to this invention provides a reinforcing means associated with the inner surface of the annular elastomer body, which reinforcing means provides a continuous reinforcing barrier for inhibiting extrusion of the annular elastomer body inwardly toward the tubular member; it should be recognized of course it is desired that a portion of the annular elastomer body (the interfacing surface 21) physically contact the tubular member and sealingly engage the tubular member. As shown more particularly in FIGS. 1 through 4, the reinforcing means preferably includes a plurality of segments 30 each of which has an inner arcuate surface 31 for extending toward the tubular member 16 to be sealingly engaged and each of which has an outer surface 32 of preselected shape for extending toward the inner surface of the annular elastomer body. Preferably the plurality of segments 30 are positioned along the inner surface of the annular elastomer body at selected spaced arcuate positions. As illustrated in FIGS. 2 and 3, since the preferred annular elastomer body has an inner surface comprising sloping surfaces 19 and 20 and an interfacing surface 21 (which physically engages the tubular member), preferably a set of segments 30 is associated with the sloping surface 19 and another set of the segments 30 is associated with the sloping surface 20. Preferably each segment is mounted on the sloping surface of the annular elastomer body by means of a pin 33 which is received in a corresponding hole drilled or bored into the elastomer body at the selected spaced arcuate positions. As shown in FIGS. 2, 3 and 4, preferably each of the segments 30 is triangularly shaped in vertical cross-section whereby it corresponds to the slope of the annular elastomer body, fits into the annular groove 12 of the body 10, and vertically engages with the tubular member 16. Preferably each segment 30 has teeth or grooves on its arcuate inner surface 31 for gripping the tubular member 16. The type of teeth and the angle at which the teeth are cut in the segment will depend upon the direction the tubular member will tend to move relative to the testing apparatus when the pressurized testing fluid is supplied against the tubular member. As shown more particularly in FIG. 1, preferably each of the segments 30 is tapered in horizontal cross-section and is spaced from its adjacent segment 30 when the annular elastomer body is not under pressure, whereby the plurality of segments 30 may move radially inwardly toward the tubular member 16 when the elastomer body moves radially inwardly toward the tubular member 16 responsive to the selected fluid pressure being supplied to its outer circumferential surface 22.

The reinforcing means associated with the inner surface of the annular elastomer body includes means for interlocking the various segments 30 to provide a continuous reinforcing barrier for inhibiting extrusion of the annular elastomer body between the various segments mounted on each of the sloping surfaces 19 and 20 irrespective of the degree of closure of the segments when the annular elastomer body and the segments sealingly engage the tubular member. Preferably the means for interlocking the plurality of segments 30 on each of the respective sloping surfaces 19 and 20 comprises a plurality of arcuate flanges 36. Preferably at least some of the segments 30 have secured to the outer surface 32 thereof such an arcuate flange 36. The arcuate flange 36 is positioned between the outer surface 32 of the segment 30 and the inner surface of the annular elastomer body. The arcuate flange has a preselected shape whereby it fits the tapered slope of the inner surface of the annular elastomer body 20 and may move annularly around the elastomer body, and also fits the arcuate shape of the outer surface of the segments 30 whereby it may easily move relative to the outer surface of the adjacent segment.

In the preferred embodiment of the annular seal illustrated in FIG. 1, each segment 30 has such an arcuate flange 36 secured thereto. As shown in FIGS. 1 and 3, the arcuate flange 36 is secured to the segment 30 such that only a portion of the outer surface 32 of the segment 30 is connected to the flange. As such, when the segment 30 and the flange 36 secured thereto are mounted on the sloping inner surface of the annular elastomer body, an annular space 37 exists between a portion of the inner surface of the elastomer body and the outer surface of the segment 30. In the preferred embodiment of the annular seal according to this invention, each arcuate flange 36 extends beyond the segment to which it is secured and into the annular space 37 existing between the inner surface of the annular elastomer body and the outer surface of the adjacent segment.

It should now be clear that the plurality of segments 30 and overlapping arcuate flanges 36 at all times provide a continuous reinforcing barrier for inhibiting extrusion of the annular elastomer body inwardly toward the tubular member 16 through the various segments mounted on one of the sloping surfaces of the inner surface of the annular elastomer body. As illustrated particularly in FIG. 1, when the improved annular seal according to this invention is in its open or unpressured configuration, the reinforcing means provides a continuous barrier inhibiting extrusion of the elastomer body; each of the segments 30 has an arcuate flange 36 secured thereto which extends into the annular space existing between the inner surface of the elastomer body and the outer surface of an adjacent segment. As fluid under pressure is supplied through the port in the body 10 into the annular groove 12, the annular elastomer body starts to move radially inwardly toward the tubular member 16. The annular elastomer body 14 supplies inward forces to the segments 30 and causes the plurality of segments 30 to move radially inwardly toward the tubular member 16. As a plurality of segments 30 and the arcuate flanges 36 move radially inwardly, the relative annular position of each of the segments 30 and flanges 36 changes with respect to the other segments and flanges mounted on the respective sloping surface of the elastomer body, that is, the annular space between adjacent segments and between adjacent flanges is decreased. However, at all times, irrespective of the degree of closure of the elastomer body and the segments associated therewith, the plurality of segments and the overlapping flanges provide a continuous barrier inhibiting the extrusion of the elastomer body between the various segments mounted on each of the sloping surfaces of the elastomer body.

As illustrated in FIGS. 1 and 3, when the improved annular seal according to this invention is in its closed configuration, each of the segments 30 is in physical contact with the tubular member and the interfacing surface 21 of the elastomer body is in physical contact with the tubular member and sealingly engages such tubular member. Although possibly a slight annular space exists between the adjacent segments 30 on each of the sloping surfaces of the elastomer body, the overlapping flanges 36 function in conjunction with the segments 30 to provide a continuous barrier inhibiting the extrusion of the elastomer body between the various segments mounted on the respective sloping surfaces of the elastomer body.

Thus, this invention provides an improved annular seal for radially sealing against a tubular member, which seal includes an elastomer body for radial movement with respect to the tubular member and an interlocking reinforcing means for continuously providing a barrier inhibiting undesired extrusion of the elastomer body irrespective of the degree of closure of the annular seal. Many variations in the form of the preferred embodiments of the improved annular seal will now be apparent to those skilled in the art. For example, rather than each of the segments 30 having a flange 36 secured thereto, an annular seal according to this invention could be constructed wherein alternating segments 30 have a flange 36 secured thereto which extends beyond the segment 30 in both directions behind the two adjacent segments. Therefor, the invention should not be limited to the preferred embodiment, but rather should extend to the full scope and spirit of the invention described and claimed in the appended claims.

I claim:

1. In a testing apparatus for externally testing a portion of a tubular member, which testing apparatus has an opening longitudinally therethrough for receiving the tubular member and which testing apparatus has at least one annular groove therein in which is secured an annular seal for externally engaging the tubular member, an improved annular seal comprising:

an annular elastomer body having an inner surface for extending generally toward the tubular member to be sealingly engaged and an outer circumferential surface for receiving fluid pressure, said inner surface including two opposing sloping surfaces which taper inwardly to an interfacing surface which physically engages the tubular member when the elastomer body is moved radially inwardly, said annular elastomer body being capable of moving radially inwardly toward the tubular member responsive to a selected fluid pressure being supplied to its outer circumferential surface and of moving radially outwardly from the tubular member to substantially its original position when the selected fluid pressure is no longer supplied to the outer circumferential surface;

a plurality of tapered segments associated with the inner surface of the annular elastomer body at selected spaced arcuate positions, each of such segments having a first arcuate surface for extending toward the tubular member to be sealingly engaged and having a second surface of preselected shape for extending toward and communicating with a corresponding one of the sloping surfaces of the inner surface of the annular elastomer body, each of such segments being positioned with respect to the elastomer body such that an annular space exists between the inner surface of the elastomer body and the second surface of the segment;

at least some of the segments including an arcuate flange secured to a portion of the second surface of the segment between the second surface of the segment and the first surface of the elastomer body, said arcuate flange extending beyond the segment to which it is secured and into the annular space between the inner surface of the elastomer body and the second surface of an adjacent segment;

whereby when the elastomer body moves radially inwardly toward the tubular member responsive to the selected fluid pressure being supplied to its outer circumferential surface, the segments and the flanges are likewise moved radially inwardly toward the tubular member and each segment as well as any flange secured thereto moves annularly relative to the other segments and flanges to provide a continuous reinforcing barrier for inhibiting undesirable extrusion of the annular elastomer body along the tubular member irrespective of the degree of closure of the annular seal and the co-acting first surfaces on the segments and the sloping portions of the inner surface on the elastomer body are disposed to apply force to the segments and urge the first surfaces of the segments into tighter frictional engagement with the tubular member upon continued application of pressure to the outer circumferential surface of the elastomer body after the interfacing surface of the elastomer body has engaged the tubular member.

2. An improved annular seal for engaging a tubular member, comprising:

an annular elastomer body having an outer circumferential surface for receiving fluid pressure and having opposing inclined surfaces which taper inwardly to an interfacing surface which physically engages the tubular member when the elastomer body is moved radially inwardly, said annular elastomer body being capable of moving inwardly toward the tubular member responsive to a selected fluid pressure being supplied to its outer circumferential surface and of moving radially outwardly from the tubular member to substantially its original position when the selected fluid pressure is no longer supplied to the outer circumferential surface;

back-up means carried by and mounted upon the inclined surfaces of the annular elastomer body on either side thereof for inward and outward radial movement with the elastomer body and for engagement with the tubular member when the elastomer body sealably engages such tubular member, the back-up means comprising a plurality of substantially non-deformable arcuate segments, each of which includes:

an arcuate surface for extending toward the tubular member to be sealingly engaged, an inclined surface for communicating with a selected portion of one of the inclined surfaces of the annular elastomer body, and an arcuate flange secured to a portion of the inclined surface;

each of the segments being positioned with respect to the sloping surface of the elastomer body such that an annular space exists between the sloping surface of the elastomer body and the inclined surface of the segment;

each of said arcuate flanges secured to a segment extending beyond the segment to which it is secured and into the annular space between the inclined surface of the elastomer body and the inclined surface of the adjacent segment, whereby when the elastomer body moves radially inwardly toward the tubular member responsive to the selected fluid pressure supplied to its outer circumferential surface, the back-up means move radially inwardly toward the tubular member to provide a continuous reinforcing barrier for inhibiting undesirable extrusion of the elastomer body along the tubular member irrespective of the degree of closure of the annular seal; and the co-acting inclined surfaces on the elastomer body and its associated back-up means being disposed to apply force to the back-up means and urge the back-up means into tighter frictional engagement with the tubular member upon continued application of pressure to the elastomer body after the annular elastomer body has engaged the tubular member.

* * * * *